United States Patent
Foulsham et al.

[11] Patent Number: 5,720,448
[45] Date of Patent: Feb. 24, 1998

[54] SHOCK ABSORBERS

[75] Inventors: Peter G. Foulsham; Stewart E. Woolsey, both of Herts, England

[73] Assignee: Matra BAe Dynamics (UK) Ltd., Hertfordshire, United Kingdom

[21] Appl. No.: 666,121

[22] Filed: Mar. 1, 1991

[30] Foreign Application Priority Data

Apr. 27, 1990 [GB] United Kingdom ............ 9009563

[51] Int. Cl.⁶ .................................................. F41G 7/32
[52] U.S. Cl. .................................................... 244/3.12
[58] Field of Search ........................................ 244/3.12

[56] References Cited

U.S. PATENT DOCUMENTS

| | | | |
|---|---|---|---|
| 3,156,185 | 11/1964 | Hermann et al. | 244/3.12 |
| 4,770,370 | 9/1988 | Pinson | 244/3.12 |
| 4,796,833 | 1/1989 | Pinson | 244/3.12 |
| 4,860,968 | 8/1989 | Pinson | 244/3.12 |

FOREIGN PATENT DOCUMENTS 2003606  8/1971  Germany .................. 244/3.12

*Primary Examiner*—Charles T. Jordan
*Attorney, Agent, or Firm*—Nixon & Vanderhye P.C.

[57] ABSTRACT

This invention relates to a shock absorber for use with a command link controlled missile system. The shock absorber being designed to absorb the shocks produced by launch and missile movements and being particularly applicable to fibre optic command link systems.

6 Claims, 2 Drawing Sheets

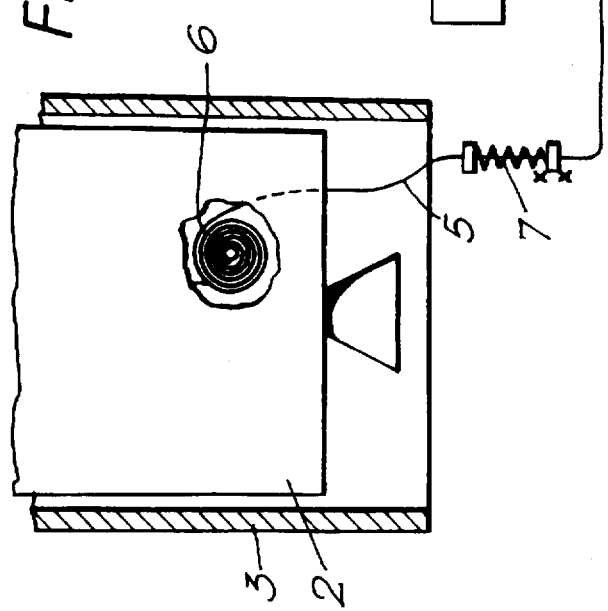
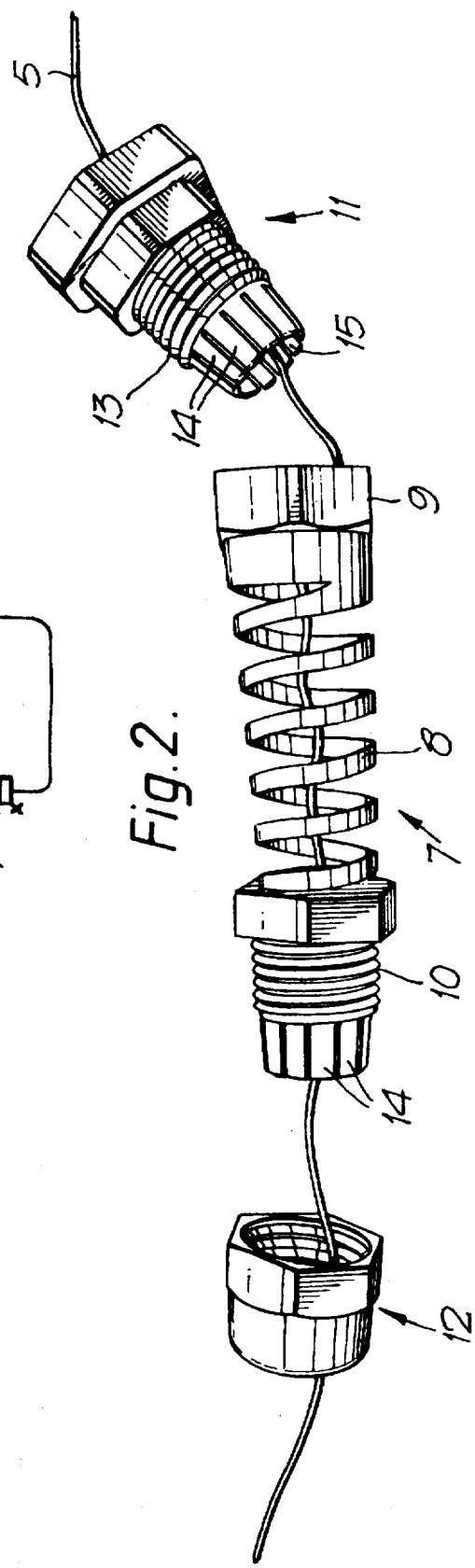

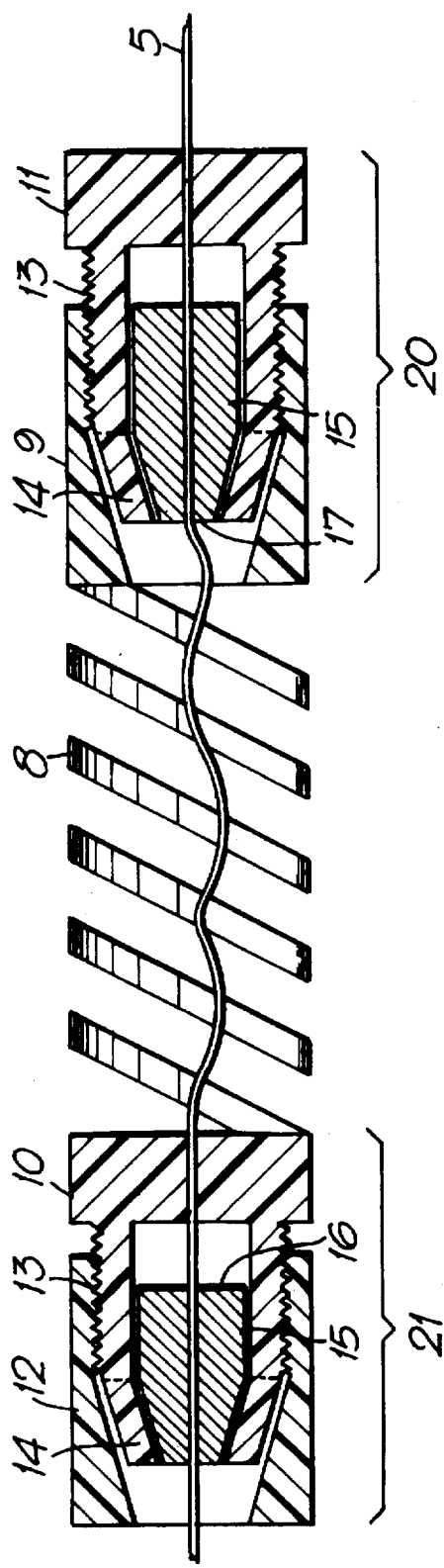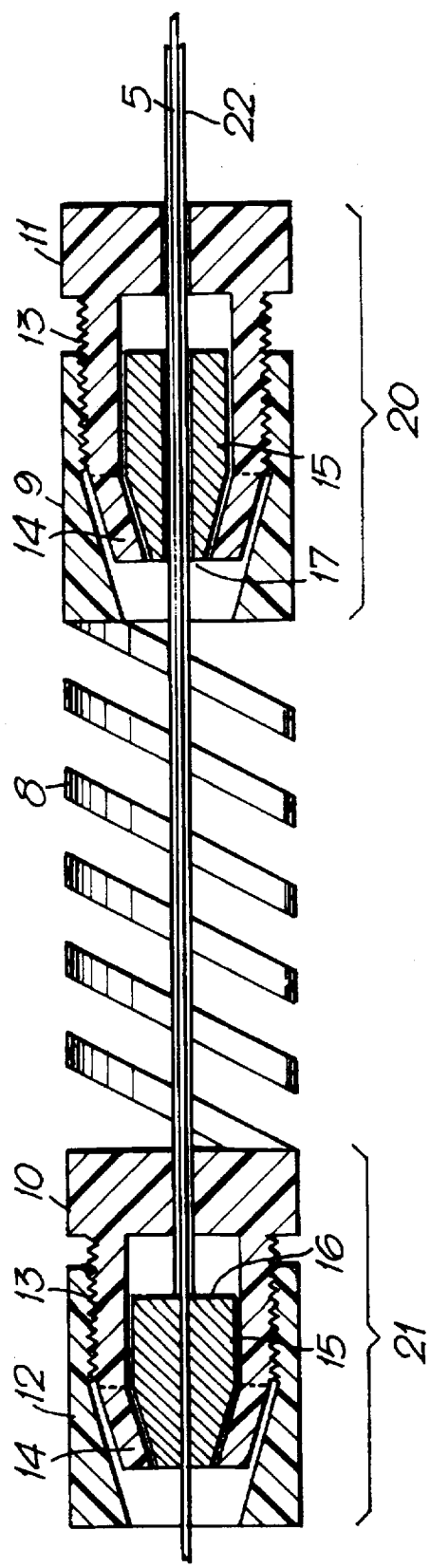

SHOCK ABSORBERS

This invention relates to shock absorbers and more particularly to shock absorbers for use with communication links.

There are a number of missile system which are controlled by communication links which transmit information between a control station and the missile. The communication link is generally a wire, which is uncoiled as the missile travels away from the control station. The launching and/or movement of the missile can put the wire under stress and may in fact break it. Some of the stress can be absorbed by a shock absorber being located on the wire near to the control station. Wire communication link shock absorbers can generally take the form of a clamp or the wire may be twisted around a rigid body.

Whilst these methods are satisfactory for wire communication links, they are not suitable for an optical fibre communication link. Clamping an optical fibre can shatter or squeeze the optical fibre thereby destroying or effecting its transmissivity. Twisting the fibre around a rigid body can cause attenuation of the radiation within the fibre, similarly effecting the transmission of information therein.

One object of the present invention is to provide a communication link shock absorber for use with optical fibre and wire links.

According to one aspect of the present invention there is provided a device for absorbing shock waves transmitted along an elongate flexible element such as the missile to control station connecting line in a wire or fibre optic guided missile system, the device comprising a coil spring and at least one clamp connected to at least one end of the spring and each operable for clamping the elongate flexible element extending through the spring in the direction of its axis, the or each clamp comprising a first portion which is screw-threaded and which has a plurality of axially extending resiliently deformable clamping fingers, a second portion which is screw-threaded for engagement with the first portion over said clamping fingers to force said clamping fingers towards one another, and a collar of relatively soft force-spreading material which is contained between said clamping fingers and through which said elongate flexible element is able to extend for the collar to be compressed into clamping engagement with the elongate flexible element as said second portion is engaged with the first and said clamping fingers are forced towards one another.

Reference will now be made, by way of example, to the accompanying drawings, in which:

FIG. 1 is a diagram of a ground to missile communication link system;

FIG. 2 is a part exploded diagram of a first embodiment of a shock absorber for use in the FIG. 1 arrangement;

FIG. 3 is a cross-sectional diagram of an unexploded FIG. 2 shock absorber; and

FIG. 4 is a cross-sectional diagram of a second embodiment of a shock absorber for use in the FIG. 1 arrangement.

Referring to FIG. 1, a missile system partially shown at 1, comprises a missile 2 for launch from a launch tube 3. The missile is connected to a control system 4 by means of a communication link 5. The communication link, for example a single mode optical fibre, is releasable from a reel 6 located within the missile body. The fibre 5 unreels during and after launch of the missile to ensure a permanent link between the missile 2 and the control system 4. The other end of the reel 6 is connected to the control system of the missile (not shown). Both launch shock waves and sudden movements of the missile can impose stresses on the fibre 5, which may be absorbed by a rigidly clamped tether and shock absorber 7.

One embodiment of shock absorber 7 is shown in more detail in FIGS. 2 and 3. The shock absorber 7 comprises a helical spring member 8 of flexible plastics type material. One end of the spring terminates in a female threaded section 9 and the other end in a male threaded section 10. Section 9 is adapted to accept a second male threaded section 11 from a fist clamp 20 and section 10 is adapted to accept a second female threaded section 12 to form a second clamp 21. Section 11 and 10 are substantially similar, and each comprise a threaded portion 13 which terminates in a number of resiliently deformable clamping fingers 14. A collar of relatively soft force-spreading material 15 is contained in sections 10 and 11 between the clamping fingers 14 with a central aperture through which the optical fibre 5 passes. The fingers 14 are deformable on application of pressure such that they may be squeezed inwards. This causes the collar 15 to also be squeezed thereby holding the optical fibre 5 rigidly, but without damaging it. The threaded sections are matched 9 with 11, and 10 with 12 such that 11 is screwed into 9, and 10 into 12. By mating the sections in this way a pressure is exerted on each set of fingers 14 by both sections 9 and 12. This causes the clamps to squeeze the collar 15 thereby holding the fibre rigidly at two points, 16 and 17. Between those two points the fibre is threaded with a degree of slack through the centre of the spring member 8 to allow for the spring to flex and not break the fibre. The whole shock absorber system 7 is fixed relative to the control station and, due to the spring, is capable of stretching, compressing, twisting, bending and generally moving in any way such that the launch and missile movement stresses and shocks are absorbed. This protects the optical fibre link 5 and allows information to be continually transceived.

For a multi-mode optical fibre a second embodiment of shock absorber may be used. This is shown in FIG. 4. It is substantially similar to the shock absorber in FIGS. 1–3, with like numerals representing like elements, however the following differences exist. The optical fibre 5 is held rigidly within the shock absorber only at point 16 by clamp 21. The function of clamp 20 in this embodiment will become apparent later. The fibre 5 is held in a guide 22 through the shock absorber to ensure that the fibre 5 is straight and there is no slack between points 16 and 17. The guide is held rigidly at 16. Clamp 20 may hold the guide rigidly if the guide is telescopic, alternatively it may lightly hold the guide so that the guide may move relative to clamp 20. The movement will be in a direction parallel to the optical fibre 5 and will be dependant on the compression or expansion of spring 8. The fibre 5 is kept straight by the guide 22 and to allow for expansion and compression of the spring 8 there is a region of slack (not shown) between the clamp 20 and the ground station. The location of the region of slack ensures that the fibre 5 may be stored to minimise attenuation.

In certain circumstances it may be possible to dispense with the clamp 20 altogether, then the guide may be supported by the spring 8 or any other type of external support.

Although it is preferred that the first embodiment is used for a single mode fibre and the second embodiment is used for a multi-mode fibre, it should be understood that both embodiments can be used with any type of fibre or wire communication link.

The resilient plastics material of which the shock absorber is made may be any suitable plastic which has the required strength and elasticity. If the shock absorber is to be located near the missile as it is launched, thermal protection or a high melting point plastic may be needed. The collar 15 may be made of any suitable plastics or rubber type material that is force-spreading.

We claim:

1. A device for absorbing shock waves transmitted along an elongate flexible element for connecting a missile to a control station in a wire or fibre optic guided missile system, the device comprising:

a coil spring; and at least one clamp connected to at least one end of the spring and operable for clamping the elongate flexible element extending through the spring in the direction of its axis, said at least one-clamp comprising:

a first portion which is screw-threaded and which has a plurality of axially extending resiliently deformable clamping fingers;

a second portion which is screw-threaded for engagement with one first portion over said clamping fingers to force said clamping fingers towards one another; and a collar of relatively soft force-spreading material which is contained between said clamping fingers and through which said elongate flexible element is able to extend for the collar to be compressed into clamping engagement with the elongate flexible element as said second portion is engaged with the first and said clamping fingers are forced towards one another.

2. A device for absorbing shock waves according to claim 1, which further comprises a guide means for supporting the elongate flexible element.

3. A device for absorbing shock waves according to claim 1, wherein there is only one clamp at the missile end of the device.

4. A device for absorbing shock waves according to claim 1 wherein there are two clamps connected to respective ends of the spring.

5. A device for absorbing shock waves according to claim 2, wherein, the elongate flexible element is a multi-mode optical fibre.

6. A device for absorbing shock waves according to claim 1, wherein the elongate flexible element is a single-mode optical fibre.

\* \* \* \* \*